United States Patent [19]

Arakawa et al.

[11] Patent Number: 5,555,394
[45] Date of Patent: Sep. 10, 1996

[54] DATA PROCESSOR WITH THE ABILITY OF FAST PARTIAL CLEARING OF BUFFER MEMORY

[75] Inventors: Fumio Arakawa, Tokyo; Kunio Uchiyama, Kodaira, both of Japan

[73] Assignee: Hitachi, Ltd., Tokyo, Japan

[21] Appl. No.: 115,026

[22] Filed: Sep. 2, 1993

[30] Foreign Application Priority Data

Sep. 11, 1992 [JP] Japan .................................... 4-242958

[51] Int. Cl.⁶ ................................................ G06F 13/00
[52] U.S. Cl. ......................... 395/462; 395/440; 395/445; 395/471
[58] Field of Search ................................... 395/775, 425, 395/410, 420, 440, 445, 462, 471

[56] References Cited

U.S. PATENT DOCUMENTS 3,979,726  9/1976  Lange et al. ................. 340/172.5
5,179,680  1/1993  Colwell et al. ..................... 395/425
5,197,144  3/1993  Edenfield et al. .................. 395/425
5,249,286  9/1993  Alpert et al. ....................... 395/425

Primary Examiner—Jack B. Harvey
Assistant Examiner—John Travis
Attorney, Agent, or Firm—Antonelli, Terry, Stout & Kraus

[57] ABSTRACT

In a data processor intended for fast partial clearing of a buffer memory which is based on a direct map scheme or a set associative scheme, a latch holds a comparison value used for partial clearing of the buffer memory, a comparator compares a tag read out of a tag array with the comparison value and asserts the clear signal in response to detection of the coincidence of both values, and a control logic circuit produces a hit signal and a new V flag from the old V flag, a coincidence signal, a clear signal and a type signal. In response to the detection of coincidence of values by the comparator, the V flag of a corresponding entry is shifted from the clear waiting state to the invalid state.

12 Claims, 3 Drawing Sheets

DATA PROCESSOR WITH THE ABILITY OF FAST PARTIAL CLEARING OF BUFFER MEMORY

BACKGROUND OF THE INVENTION

1. Field of the Invention

The present invention relates to a data processor, and more particularly to a data processor, such as a microprocessor, having a buffer memory (cache memory) which is based on a direct map scheme or set associative scheme and having the ability of fast partial clearing of the buffer memory.

2. Description of the Related Art

Partial clearing of a buffer memory is a process of invalidating an entry of the buffer memory when part of tag bits of the entry are coincident with a designated value. This process is used, for example, when part of entries of the address translation look aside buffer memory (address translation cache memory) mismatch with the entries of the address translation table as a result of rewriting of the address translation look aside table and these buffer entries need to be invalidated. If this partial clearing is not possible, all entries will have to be invalidated, resulting in a degraded hit rate.

When a buffer memory has an increased capacity, in which case the proportion of unmatched entries decreases relatively, an unnecessary clearing process associated with all-entry invalidation will increase. Therefore, in increasing the capacity of a buffer memory with a possibility of mismatching of part of entries, such as the address translation buffer and logical cache, it is necessary to provide the ability of partial clearing.

Conventionally, buffer memories based on the full associative scheme are capable of carrying out simultaneous tag comparison for all entries and accordingly fast partial clearing can take place, whereas buffer memories based on the direct map scheme or set associative scheme necessitate sequential reading of tags of entries for comparison, and time spent for partial clearing increases in proportion to the number of entries, i.e., the capacity of buffer memory.

SUMMARY OF THE INVENTION

There is a demand for the increased capacity and access speed of buffer memories to meet the enhanced performance of microprocessors or the like.

Buffer memories of the full associative scheme, in contrast to those of the direct map scheme and set associative scheme, need to have a coincidence comparator for each tag cell and need to memorize all tag bits, resulting in an increased area of tag array, and therefore they are not suitable to have large capacities. For the fast access performance, it is necessary to speed up the coincidence comparator by increasing the size of a tag cell, which results in a further increase in the tag array area and thus difficulty of increased capacity.

An object of the present invention is to accomplish a large-capacity buffer memory having a capability of fast partial clearing.

A more specific object of the present invention is to provide capability of fast partial clearing for a buffer memory which is based on the direct map scheme or set associative scheme.

These objectives are achieved in the following manner. At the issuance of a partial clearing command, a value of comparison is latched, but the entry clearing process is not yet implemented. At a subsequent access to the buffer memory, the tag of the accessed entry is compared with the latched comparison value and, on detecting their coincidence, the entry is invalidated and the hit signal is not asserted.

However, this basic clearing scheme is too simple to overcome the following improprieties. If the tag of an entry which has been stored after the command of partial clearing coincides with the comparison value, the entry will be cleared erroneously at the time of access and will not be hit. If partial clearing has not completed until another issuance of the partial clearing command, the latch of comparison value cannot be updated.

The above-mentioned problems are solved as follows. The conventional single valid-bit of each entry is increased to two bits so that it can set one of the valid, invalid and clear waiting states and can have state transitions as shown in FIG. 4. Initially, when an entry is stored, it is brought to the valid state irrespective of the former state. At the issuance of the partial clearing command, entries of the valid state are shifted to the clear waiting state and entries of the clear waiting state are shifted to the invalid state. The state shift operation takes place at once for all entries. An entry which is accessed in the clear waiting state is shifted to the invalid state without the assertion of the hit signal in case the tag coincides with the comparison value, or shifted to the valid state with the assertion of hit signal in case the tag does not coincide with the comparison value. The assertion of hit signal always takes place when an entry in the valid state is accessed.

According to this operating rule, entries which have not been accessed at all during the period between two partial clearing commands will be invalidated at the second partial clearing command. However, these entries are less likely to be accessed later on, and conceivably their invalidation is scarcely influential on the hit rate.

Based on this manner of overcoming the above-mentioned problems, partial clearing of a buffer memory of the direct map scheme or set associative scheme can be carried out easily and fast.

DESCRIPTION OF THE PREFERRED EMBODIMENT

Figure 1:
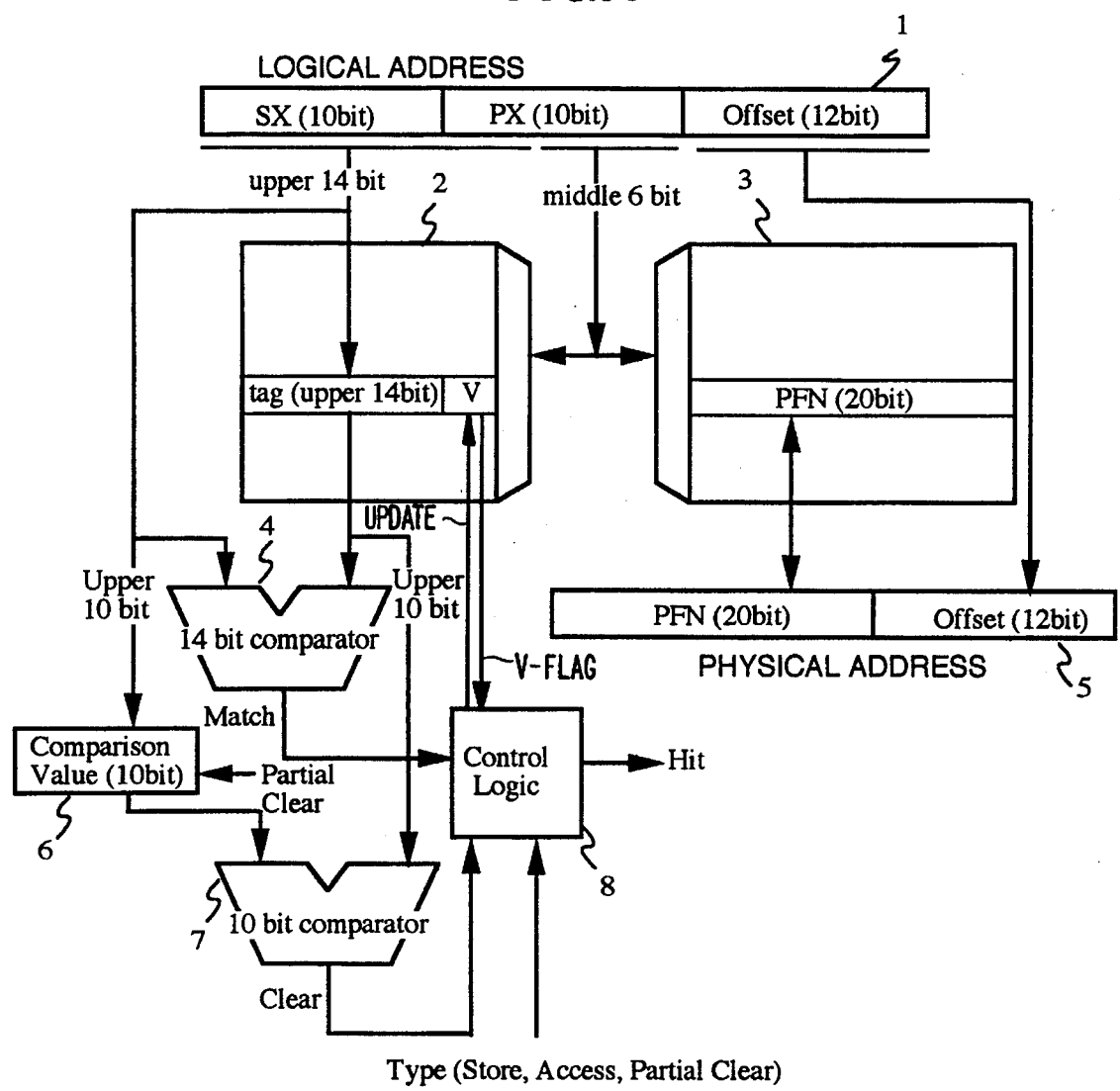
FIG. 1 is a block diagram showing a 64-entry direct map address translation buffer based on an embodiment of the present invention.

FIG. 1 shows a 64-entry direct map address translation buffer used in the microprocessor based on an embodiment of the present invention. The buffer memory employs a two-stage address translation scheme as shown in FIG. 2, and it will be explained at the beginning.

Figure 2:
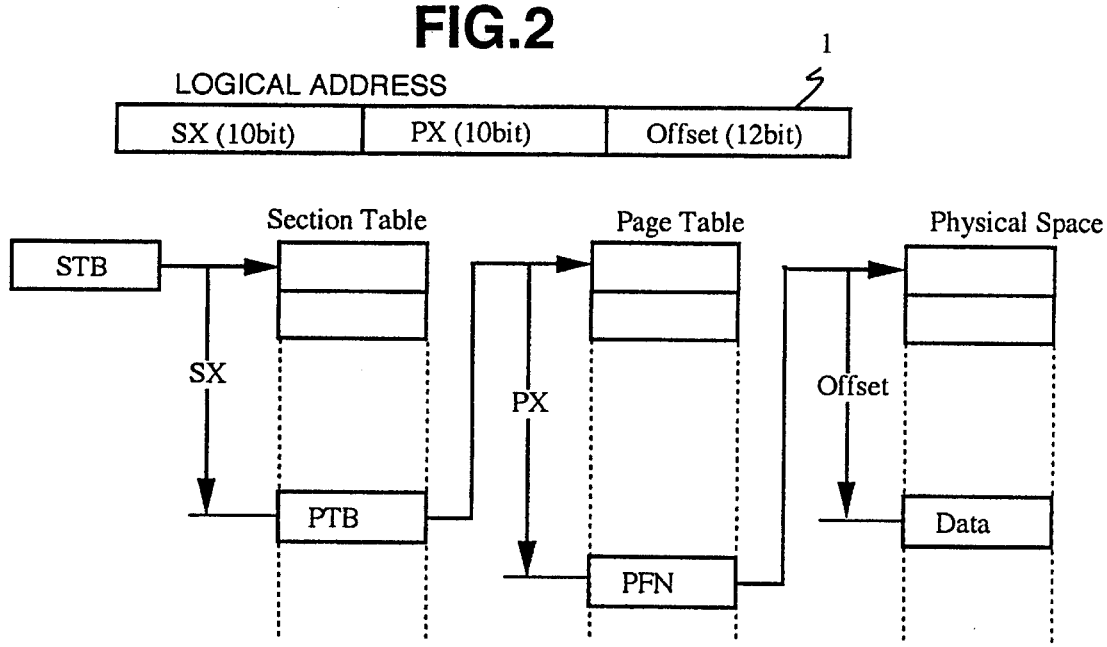
FIG. 2 is a diagram showing the address translation by the address translation buffer based on the embodiment of the present invention.

A 32-bit address system shown in FIG. 2 can cover a logical address space of 4G bytes. The address space is partitioned into 4M-byte sections, and each section is divided into 4K-byte pages. In correspondence to this logical memory structure, a 32-bit address word is divided into three sections, including a high-order 10-bit section index (SX), a mid-order 10-bit page index (PX), and a low-order 12-bit offset. Each section has a page table, with the beginning or top of the page table being pointed by a page table base (PTB) which is written in a section table. The top of the section table is pointed by a section table base (STB) which is held in a latch. By adding the SX to the STB, the pointer to the PTB of the section is obtained. Written in the page table are page frame numbers (PFNs) in correspondence to pages. The PFN represents high-order 20 bits of a physical address. The pointer to a PFN is obtained by adding the PX to the PTB.

The foregoing address translation is summarized as follows. Initially, a logical address is divided into SX, PX and offset. Next, the SX is added to the STB to obtain the pointer to a PTB, and the PTB is read out of the memory. The PX is added to the PTB to obtain the pointer to a PFN, and the PFN is read out of the memory. Finally, the offset is added to the PFN to obtain a physical address.

Figure 3:
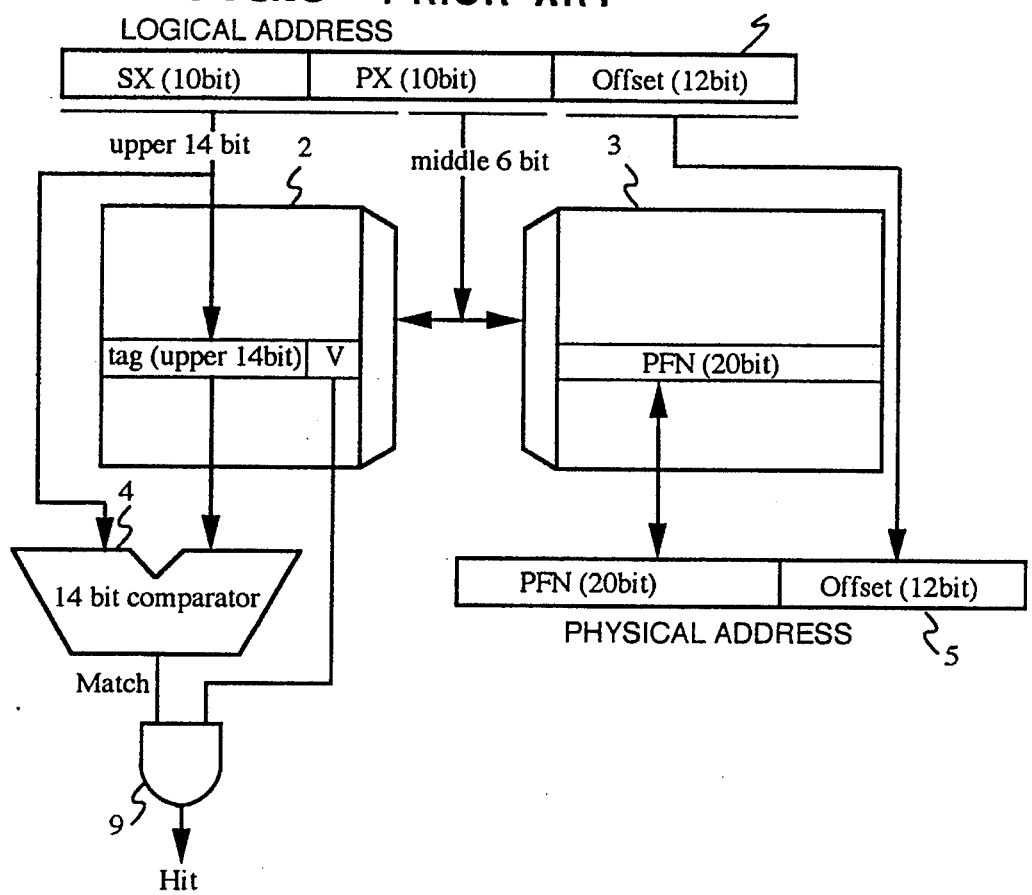
FIG. 3 is a block diagram showing a conventional 64-entry direct map address translation buffer.
Figure 4:
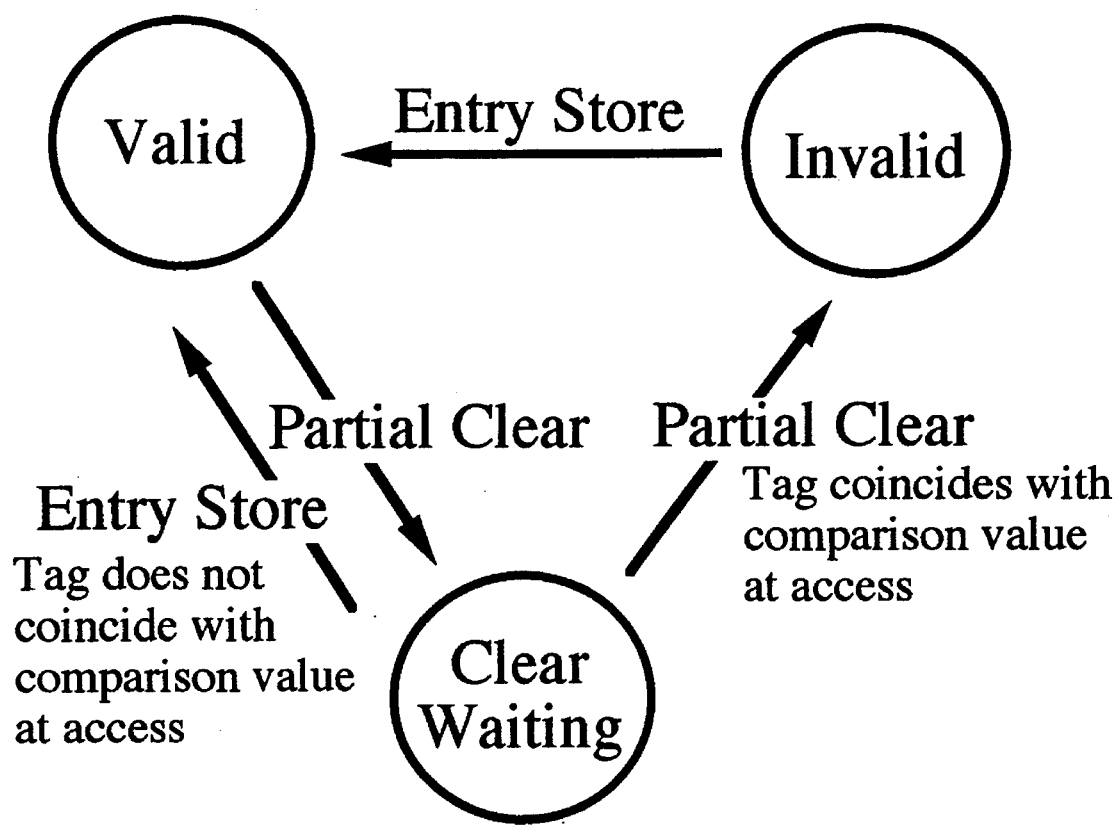
FIG. 4 is a diagram showing the state transitions of entry of the buffer memory based on the present invention.

The address translation buffer which implements the foregoing address translation scheme is configured as shown in FIG. 3, for example. This is an example of the direct map scheme for 64 entries. The low-order 12 bits are not varied by the address translation operation, and the buffer holds a pair of high-order 20 bits of a logical and physical addresses (translation pair). In FIG. 3, indicated by a reference numeral 1 is a logical address, 2 is a tag array, 3 is a data array for holding PFN, 4 is a 14-bit comparator, 5 is a physical address produced by the address translation buffer, and 9 is an AND gate for producing a hit signal.

The address translation buffer shown in FIG. 3 operates as follows. At the time of storing an entry, the low-order six bits out of the high-order 20 bits of the logical address are decoded to determine a store entry. The high-order (upper) 14 bits of the logical address and a V flag indicative of the validity of the entry are written to the tag array of the entry, and the PFN is written to the data array. Next, in carrying out the address translation with the address translation buffer, it decodes the low-order six bits out of the high-order 20 bits of the original logical address thereby to determine a read-out entry, reads out the high-order 14 bits of the stored logical address, V flag and PFN, compares the high-order 14 bits of the original logical address with the counterpart of the read-out logical address, and asserts the hit signal if the V flag is set and both parts are coincident. Finally, the read-out PFN is linked to the low-order 12 bits of the original logical address to complete a physical address.

Partial clearing of the address translation buffer becomes necessary at the time of rewriting the section table. When the section table is rewritten, all address translation pairs of the revised sections will become mismatched. On this account, it is necessary to invalidate the entries corresponding to the updated sections of the address translation buffer, i.e., the entries having SX of the revised sections. Specifically, all entries are invalidated or entries with the relevant SX are invalidated by sequentially reading out all of 64 entries, in the case of the address translation buffer shown in FIG. 3. The former operation invalidates even entries which need not be invalidated, whereas the latter operation spends time for reading out the address translation buffer 64 times at maximum.

Next, the 64-entry direct map address translation buffer based on the present invention shown in FIG. 1 will be explained. The basic arrangement is the same as the address translation buffer of FIG. 3, with differences being control of the V flag and the generation logic for the hit signal.

The functional blocks 1 through 5 are the same as those shown in FIG. 3 except for the V flag of the tag array 2. The V flag consists of two bits for setting 11, 00 or 10 which represent the valid, invalid or clear waiting state, respectively. Indicated by a reference numeral 6 is a latch for holding the comparison value used for partial clearing, 7 is a comparator for asserting the clear signal in response to a coincident result of comparison between the read-out tag and comparison value, and 8 is a control logic circuit for producing a hit signal and a new V flag from the old V flag, a coincidence signal from comparator 4, a clear signal from comparator 7 and a type signal from an instruction decoder, for example. The type signal represents an entry store operation, access operation or partial clear operation.

The address translation buffer of FIG. 1 operates as follows. Storing of an entry is carried out in the same manner as the case of the address translation buffer of FIG. 3. For requesting the clearing of the address translation pair of one section in rewriting the section table or the like, the comparison value for partial clearing, i.e., the value of SX of the section, is held to the latch 6 and the V flags of all entries are shifted from the valid, invalid and clear waiting state to the clear waiting, invalid and invalid states, respectively.

Address translation is identical to the case of FIG. 3 up to the generation of a physical address and coincidence signal. In addition, in the address translation buffer of FIG. 1, if the comparison value in the latch 6 is effective, the tag read out of the tag array 2 is compared with the latched comparison value by the comparator 7 and the clear signal C is asserted only in response to a coincident result of comparison. For the coincident output M of the comparator 4, the V flag value Vc indicative of the clear waiting state and the V flag value Vv indicative of the valid state, the control logic circuit 8 produces the hit signal (HIT) and update signal (Update) in accordance with the following logic operations.

$$HIT = M \cdot (Vc \cdot \bar{C} + Vv)$$

$$Update = M \cdot Vc$$

where the Update signal indicates that the V flag of the read-out entry is to be updated or not.

In case the Update signal is asserted, the V flag of the read-out entry is shifted to the invalid state when the clear signal is asserted, or otherwise it is shifted to the valid state.

According to the present invention, a buffer memory which is based on the direct map scheme or set associative scheme can undergo fast partial clearing irrespective of the capacity.

We claim:

1. A data processor comprising:

a buffer memory including a tag array of a plurality of entries and a data array of a plurality of entries;

a first comparator which compares address information read out from said tag array in accordance with an address signal with address information of said address signal, said first comparator for performing hit determination;

a latch circuit which holds address information used for partial clearing of said buffer memory; and a second comparator which compares the address information held in said latch circuit with the address information read out of said tag array, said second comparator for performing determination of partial clearing;

wherein each entry of said tag array has a flag indicating a valid state, an invalid state or a clear waiting state, and wherein in response to the output of said second comparator indicative of coincidence of both inputs of address information, the flag of a corresponding entry of said tag array is shifted from the clear waiting state to the invalid state.

2. A data processor according to claim 1, wherein in response to an output of said second comparator indicative of non-match of both inputs of address information, the flag of a corresponding entry of said tag array is shifted from the clear waiting state to the valid state.

3. A data processor according to claim 1, wherein said buffer memory comprises an address translation buffer memory.

4. A data processor according to claim 2, wherein said buffer memory comprises an address translation buffer memory.

5. A data processor according to claim 1, wherein said entry flag of said tag array includes at least two bits so as to indicate one of the valid state, invalid state and clear waiting state of the entry.

6. A data processor according to claim 2, wherein said entry flag of said tag array includes at least two bits so as to indicate one of the valid state, invalid state and clear waiting state of the entry.

7. A data processor according to claim 3, wherein said entry flag of said tag array includes at least two bits so as to indicate one of the valid state, invalid state and clear waiting state of the entry.

8. A data processor according to claim 4, wherein said entry flag of said tag array includes at least two bits so as to indicate one of the valid state, invalid state and clear waiting state of the entry.

9. A data processor according to claim 1, wherein said buffer memory comprises a buffer memory which is based on a direct map scheme or a set associative scheme.

10. A data processor according to claim 2, wherein said buffer memory comprises a buffer memory which is based on a direct map scheme or a set associative scheme.

11. A data processor according to claim 3, wherein said buffer memory comprises a buffer memory which is based on a direct map scheme or a set associative scheme.

12. A data processor according to claim 4, wherein said buffer memory comprises a buffer memory which is based on a direct map scheme or a set associative scheme.

* * * * *